No. 623,673. Patented Apr. 25, 1899.
T. E. KAVANAGH.
REVERSIBLE GANG PLOW.
(Application filed June 23, 1898.)
(No Model.) 2 Sheets—Sheet 1.
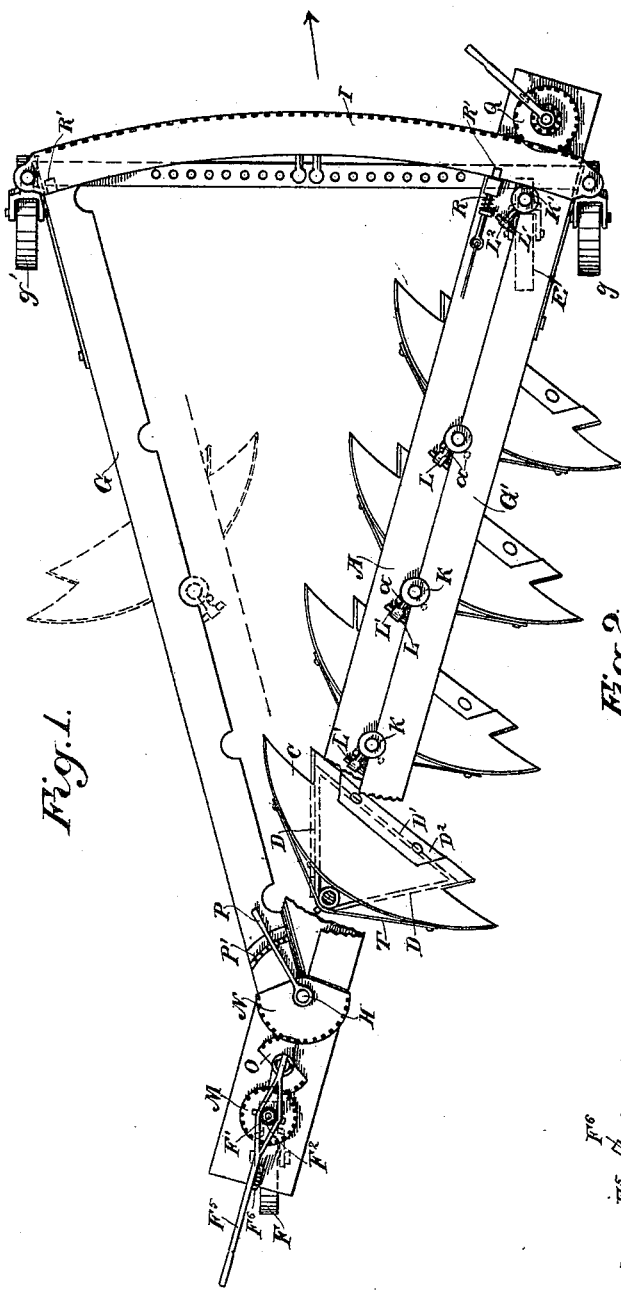
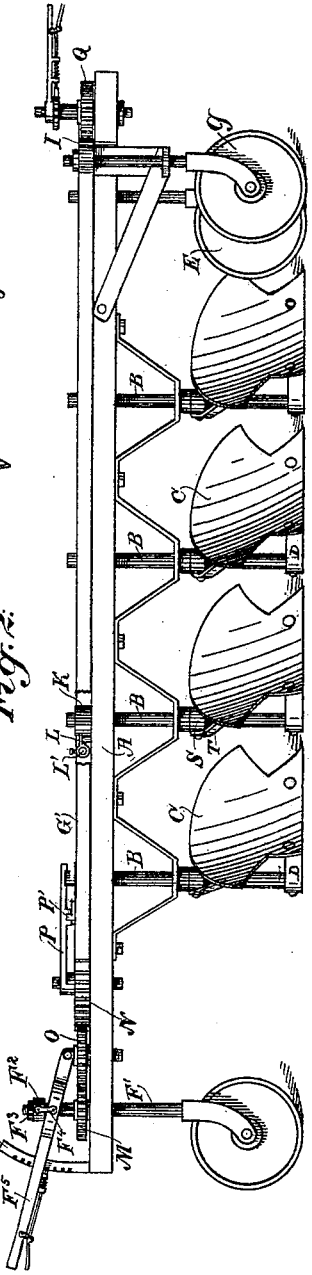
Witnesses,
Inventor,
Thomas E. Kavanagh
By Dewey Strong & Co.
Attys No. 623,673. Patented Apr. 25, 1899.
T. E. KAVANAGH.
REVERSIBLE GANG PLOW.
(Application filed June 23, 1898.)

(No Model.) 2 Sheets—Sheet 2.

Witnesses, Inventor
Thomas E. Kavanagh
By Dewey Strong & Co.
Attys

THE NORRIS PETERS CO., PHOTO-LITHO., WASHINGTON, D. C.

UNITED STATES PATENT OFFICE.

THOMAS E. KAVANAGH, OF VALLEJO, CALIFORNIA.

REVERSIBLE GANG-PLOW.

SPECIFICATION forming part of Letters Patent No. 623,673, dated April 25, 1899.

Application filed June 23, 1898. Serial No. 684,222. (No model.)

*To all whom it may concern:*

Be it known that I, THOMAS E. KAVANAGH, a citizen of the United States, residing at Vallejo, county of Solano, State of California, have invented an Improvement in Reversible Gang-Plows; and I hereby declare the following to be a full, clear, and exact description of the same.

My invention relates to a gang-plow and a means for reversing the position of the plows, so that they can be used on hillsides or wherever it is desired to throw the furrows in the same direction.

It consists, essentially, of a triangular frame having draft devices connected with the broad end or base of the triangle, a plow-beam fulcrumed at the apex, at the rear, and turnable about its pivot, so that either one or the other of the long sides of the triangular frame will stand essentially parallel with the beam, plows having double landsides and moldboards, the standards of which are journaled in the plow-beam, and a means for turning said moldboards and landsides about the vertical axes of the standards, so that by swinging the triangular frame from one side to the other about its pivot-point it will reverse the position of the plows.

The invention also consists in details of construction, which will be more fully explained by reference to the accompanying drawings, in which—

Figure 3:
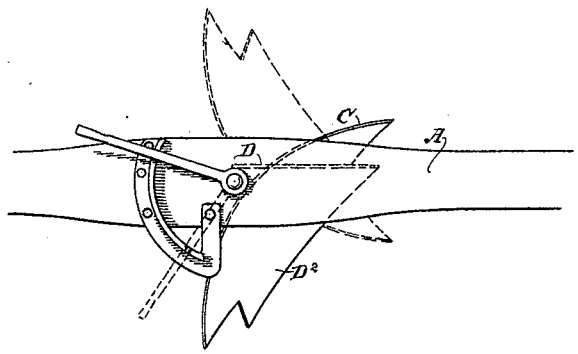
Figure 5:
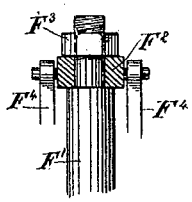
Figure 4:
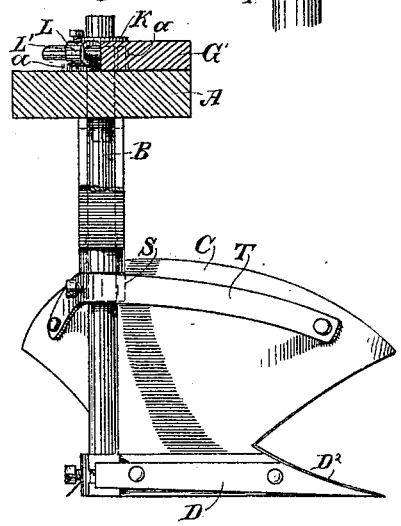

Figure 1 is a plan view of my improved plow. Fig. 2 is a side elevation. Fig. 3 shows my device as applied to a single plow. Fig. 4 is a detail of a plow and its connections. Fig. 5 is a detail of the head of the shank of the rear swivel-wheel.

A is a plow-beam of suitable width and thickness and of a length sufficient to carry as many plows as it is desired to use in the gang.

B are vertical standards suitably braced and journaled, so as to turn about their vertical axis in the beam A. The moldboards C and landsides D of the plow are suitably connected and turnable with the vertical shafts, the moldboards being braced, as shown, and when the moldboards are set at an angle in one direction with the line of travel of the plow-beam a furrow will be turned to one side, and by turning the plows to stand at the opposite angle the furrows will be turned in the opposite direction. Thus if plowing upon a hillside the plow may be made to turn the furrow down the hill when going in either direction along the hillside or without changing direction.

The front and rear ends of the plow-beam A are supported upon swivel or caster wheels E and F, respectively.

G G' are the sides of a triangular frame the apex of which is pivoted or journaled to the plow-beam A, as shown at H, and the front or broad end, which forms the base and which here is shown as a segment I, is movable with relation to the front end of the plow-beam A, turning about the pivoted pin H, so either the sides G or G' can be brought approximately into line with the plow-beam, and, the draft being applied near the center of the segment I, the beam carrying the plow will be shifted either to one side or the other of the triangular frame, and at the same time the plows will be turned about their axes, so as to stand in proper position for turning the furrow in either direction.

When the plow is in use, if it is used as a right-hand plow, the side G of the triangle will travel essentially in the line of the furrows, while the other side G' will stand at an angle therewith depending on the width of the front end in proportion to the length of the sides, and the plow-beam A will be turned so as to stand nearly in line with this triangular bar G' of the frame. This brings the plows into proper position to turn the furrows one after the other and as many as there may be plows mounted upon the beam A.

G G' are caster-wheels which alternately support the outer angle of the frame when turned to one side or the other.

When the plow is to be used as a left-hand plow, the triangular frame will be shifted so that the side G stands in line with the plow-beam, and the other side G', which is moved away from the line of the plow-beam, will then travel in the line of the furrow, while the plow-beam will stand at an angle to the left of the line of travel. The plows will be shifted in unison with this movement, so that they then stand in position to turn furrows to the left instead of to the right. It will then be seen that by this simple movement of the pivoted frame G G' the line of draft and travel can be instantly changed and the plows will be reversed, as follows: Upon the upper ends of the plow-standards B are fixed collars K, having projecting arms with T-shaped heads, as shown at L. These T-shaped heads lie upon the top of the beam A, the ends projecting toward each side in such a manner that when the frame G G' swings to one side or the other it will strike one of the ends of the arms L, and moving it will turn the standard B, and with it the moldboard and plowshare, so that their angular position will be changed sufficiently to present them properly to the ground to turn the furrow in the new direction. In order to adjust these arms to regulate the amount of turn, extensions may be employed and made adjustable, so as to project more or less, and thus increase or diminish the amount of turn which is given to the standard and plow by the contact of the side bars G G'. These extensions may be regulated in various ways. I have here shown them as made with small movable bars L', which are adjusted and locked in position by set-screws or by other convenient devices. Stops $a$ limit the movement and regulate the distance to which the plows may be turned. The wheels E and F, upon which the plow-beam is supported, must also be turned whenever the position of the beam is changed with relation to the triangular frame G G' in order to bring these wheels parallel with the line of travel of the frame while the plow-beam itself stands diagonally to said line of travel.

The standard of the front wheel E is provided with a collar K', similar to those fixed upon the turntable plow-standards, and this collar has projecting arms $L^2$, similar to the arms L, previously described, and these arms also have the adjusting extensions L'. Now when the frame G G' is turned with relation to the plow-beam the plows will be turned to either make a right or left hand furrow, and the wheel E will be at the same time turned so that it travels in or near the last furrow which has been turned. The adjacent wheel $g$ of the movable frame is then an idler, and the outer angle of the frame is borne upon the other wheel $g'$.

The mechanism for turning the wheel F consists of a gear-wheel M, fixed to the head of the wheel standard or shank, and segment N, fixed to the rear apex of the side bars G G', and an intermediate double segment O, pivoted between and engaging the two, as shown.

The movements of the frame G G' with relation to the plow-beam A will act upon these gears and simultaneously turn the wheel F to stand parallel with that side of the movable frame which is to travel in line with the furrows, this wheel traveling upon the land. In some cases it may be found necessary to turn the wheel still farther, as upon a steep side-hill or where it is necessary to resist the tendency of the plows to run out or in. This adjustment is made independently by the lever-arm P, which connects with the segment N and by which the latter may be turned more than it would be turned by the movement of the frame G. This lever-arm P is held at any point of adjustment by a rack P'.

In order to raise or lower the plow-beam to suit the depth of plowing, the beam is made to slide up and down with relation to the standard, and the gear-wheel M, with which it is connected by means of a feather and keyway, permits of this sliding movement.

Upon the head of the shank or standard F' is a loosely-turnable collar $F^2$, held in place by a nut $F^3$, the collar resting upon a shoulder formed upon the upper end of the standard, and links or arms $F^4$ extend down upon each side from the collar and connect with the lever $F^5$, fulcrumed upon the center of the intermediate gear O. This lever extends rearwardly and has a handle by which it can be moved, so as to slide the standard F' through the plow-beam to raise or lower the latter. A rack $F^6$, of any suitable or ordinary construction, serves to hold the lever at any desired point of adjustment.

The movement of the frame G G' from one side to the other is effected by means of a toothed pinion Q, journaled upon the plow-beam in front of the curved forward end I of the frame G G', and rack-teeth are formed or fixed upon this curved front, so that the pinion engages with them. By means of the lever or ratchet mechanism the pinion Q may be turned so as to cause the frame G G' to move about its pivot-point at H and cause the front end to travel from one side to the other with relation to the plow-beam A. When it reaches its final position at either side, it is temporarily locked with relation to the plow-beam by means of a spring-pressed catch R, which engages with a notch R' on the frame.

The draft-bar is similar to those which are used upon the class of triangular plows known as the "Stockton Gang Plow" and is suitably braced and fixed below the front bar I of the triangular frame. The plow-point is triangular in shape, being fastened so that it can be reversed or turned to keep the point sharp.

The moldboard is secured to the plow-standard by means of a collar S, fixed upon the standard B. Braces T extend from the upper part of the moldboard to the rear of the standard, where they are secured by screws or bolts. The upper part of the moldboard is also secured centrally to the collar S by a screw or bolt. The landside D is bent around the lower end of the standard and is secured thereto by bolt. A connecting bar or piece D' extends across the upper part from point to point of the landside, and this serves as a support to which the share $D^2$ is bolted, so as to form a continuation from the lower part of the moldboard.

The share is constructed with a curvature and lugs at each end, which serves to take the strain off the point and the bolts. It will be understood that essentially the same construction for turning the plow about its vertical standard may be employed upon a single plow, in which case the plow may be turned by a lever and retained in position with relation to the line of travel of the plow-beam by any suitable form of holding-rack. In this case I have the landside made stationary and independently supported in line behind the plow, so that whichever way the plow is turned the cutting edge of the share will fall essentially in line with the stationary landside.

Having thus described my invention, what I claim as new, and desire to secure by Letters Patent, is—

1. In a gang-plow, a single beam having plow-standards journaled vertically with relation to it, plows fixed to the lower part of said standards and turnable therewith so as to make either a right or left hand furrow, a supplemental triangular frame having its rear apex pivoted to the plow-beam and the base or front movable transversely with relation thereto, whereby one side of the frame is brought approximately into line with the plow-beam standing diagonally with the line of travel and the other side essentially in line of travel of the plow.

2. In a gang-plow, a single beam having plows turnably connected therewith so as to turn either a right or left hand furrow, a supplemental triangular draft-frame having the rear apex pivoted to the plow-beam, means for turning said frame so that either side is brought approximately into line with the plow-beam while the other remains in the line of travel of the plow, and contact-arms whereby the plows are turned to the proper position when the frame is moved with relation to the beam.

3. In a gang-plow, a single plow-beam having plows the standards of which are turnable with relation to the beam to present the plows so as to turn a furrow either to the right or left, adjustable contact-arms fixed to the upper ends of the standards a triangular draft-frame having its rear apex pivoted to the plow-beam, means whereby the front is swung with relation to the plow-beam so as to bring either side of the triangle approximately in line with the beam, said side contacting with the turning arms so as to rotate the plow-standards and bring the plows into proper position.

4. In a gang-plow, the plow-beam having plows with vertical standards turnable with relation to the beam so as to present the plow in position to turn either a right or left furrow, a triangular frame having its apex pivoted at the rear to the plow-beam, means for turning said frame to bring either of its sides approximately into line with the plow-beam, contact-pieces whereby such adjustment turns the plows to the proper position, bearing-wheels at the front and rear of the plow-beam, and means for turning said wheels with each change of position of the draft-frame so that the wheels will stand in the line of travel of the plow.

5. In a gang-plow, a plow-beam having plows turnably connected therewith, a triangular frame having the rear apex pivoted to the plow-beam, means for turning said frame with relation to the plow-beam so that the latter stands at an angle either to the right or left of the line of travel of the plow, a swivel-wheel by which the front of the plow-beam is supported, arms connected with the standard thereof and with the plow-standards whereby the plows and the swivel-wheel are turned whenever the frame is shifted to one side or the other, and a means for correspondingly turning the rear wheel to stand in line of travel of the plow.

6. In a gang-plow of the character described, a plow-beam with turnably-attached plows, a triangular shifting frame, a rear bearing-wheel, the standard of which extends upwardly through the beam, toothed gears connected respectively with the wheel-standard and with the rear of the triangular turning frame, and an intermediate segment with which both engage whereby the turning of the triangular frame acts to simultaneously turn the wheel to stand in the direction of the line of travel.

7. In a gang-plow of the character described, the plow-beam having plows with their standard turnably connected with the beam, a triangular draft-frame having the rear apex pivoted to the plow-beam and the front movable from side to side with relation to the plow-beam, mechanism whereby the turning of said frame acts to change the position of the plows and to turn the front bearing-wheel, toothed gears fixed to the rear-wheel standard, and to the rear of the triangular frame, an intermediate gear with which both engage so that the movement of the frame simultaneously turns the wheel to stand in the line of travel of the plows and a supplemental lever connecting with the actuating-segment, whereby the latter may be moved to a greater or less degree than the normal movement of its actuating-frame.

8. In a gang-plow of the character described, the plow-beam, the triangular draft-frame pivoted thereto, mechanism whereby said frame is turned from side to side about its pivot-point with relation to the plow-beam, plows the standards of which are turnably connected with the beam, a means for changing the position of the plows simultaneously with the movement of the triangular frame, bearing-wheels at the front and rear of the plow-beam with means for turning them to stand in the line of travel of the plow, a fulcrumed lever by which the rear of these wheels may be moved with relation to the plow-beam to raise or depress the latter, said lever being connected by links with a loosely-turnable collar upon the plow-standard, and toothed gears by which said standard is turnable with relation to the plow-beam and to a lever and its collar.

9. In a gang-plow of the character described, the vertically-journaled turnable plow-standards, landsides bent around and bolted to the lower end of the standards with a connecting-piece extending across between the points of said landsides and forming a support for the plowshare and the moldboard which are bolted thereto, a collar fixed to the standard in line with the upper end of the moldboard and bolts whereby the latter is secured to said collar as described.

10. In a plow of the character described, the plow-beam having the plow-standards journaled to turn with relation thereto, a mechanism by which the plow may be turned to turn a right or left hand furrow, the bent landside bolted to the foot of the standard, and a connecting-strip bolted diagonally across from one point of the landside to the other, a plowshare bolted to said strip, a moldboard forming a smooth continuation with the share, a collar fixed to the standard at the upper edge of the moldboard, bolts by which the moldboard is secured to the front of said collar and braces the outer ends of each bolted to the ends of the moldboard, the central portion of said braces extending behind the collar and being bolted thereto.

11. In a plow of the character described, a double-pointed share with vertical standards and adjusting mechanism by which the share may be reversed without changing the direction of travel, in combination with a double moldboard acting in unison therewith, each end of said moldboard also active alternately as a colter.

In witness whereof I have hereunto set my hand.

THOMAS E. KAVANAGH.

Witnesses:
 GEO. H. STRONG,
 S. H. NOURSE.